United States Patent
Yasuo

(10) Patent No.: US 7,617,406 B2
(45) Date of Patent: Nov. 10, 2009

(54) SYSTEM AND METHOD FOR SAVING POWER CONSUMPTION BY INDIVIDUALLY REDUCING POWER USAGE OF EACH OF PLURALITY OF COMPUTERS TO A RESPECTIVE LOWER LIMIT WITHIN A SERVER SYSTEM

(75) Inventor: Akihiro Yasuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 519 days.

(21) Appl. No.: 11/439,968

(22) Filed: May 25, 2006

(65) Prior Publication Data

US 2007/0186121 A1 Aug. 9, 2007

(30) Foreign Application Priority Data

Feb. 7, 2006 (JP) .............................. 2006-030192

(51) Int. Cl.
*G06F 1/32* (2006.01)

(52) U.S. Cl. .................. 713/320; 713/321; 713/324

(58) Field of Classification Search .................. 713/300, 713/310, 320, 321, 322, 323
See application file for complete search history.

(56) References Cited

U.S. PATENT DOCUMENTS

| | | | |
|---|---|---|---|
| 7,340,621 B2 * | 3/2008 | Lam | 713/300 |
| 7,467,311 B2 * | 12/2008 | Bahali et al. | 713/320 |
| 2006/0206729 A1 * | 9/2006 | Hentschel et al. | 713/300 |

FOREIGN PATENT DOCUMENTS

JP 2005-202506 7/2005

\* cited by examiner

*Primary Examiner*—Thuan N Du
(74) *Attorney, Agent, or Firm*—Staas & Halsey LLP

(57) ABSTRACT

A server system includes a control device and plurality of server devices. The control device calculates an actual power consumption of the server system and notifies the actual power consumption to the server devices. Each server device compares the actual power consumption with a threshold value, and restricts power consumption of the server device based on a power-saving policy for the server device that represents a lower limit of power usable by the server device when the actual power consumption is greater than or equal to the threshold value.

13 Claims, 8 Drawing Sheets

FIG.3

| FLOOR | POWER DISTRIBUTION RATIO | POWER DISTRIBUTION VALUE |
|---|---|---|
| FLOOR 1 | 40% | 80 KW |
| FLOOR 2 | 20% | 40 KW |
| FLOOR 3 | 20% | 40 KW |
| FLOOR 4 | 20% | 40 KW |

FLOOR 1: 80 KW

| SYSTEM | POWER DISTRIBUTION RATIO | POWER DISTRIBUTION VALUE |
|---|---|---|
| SYSTEM 1 | 50% | 40 KW |
| SYSTEM 2 | 50% | 40 KW |

SYSTEM 1: 40 KW

| RACK | POWER DISTRIBUTION RATIO | POWER DISTRIBUTION VALUE |
|---|---|---|
| RACK 1 | 30% | 12 KW |
| RACK 2 | 30% | 12 KW |
| RACK 3 | 20% | 8 KW |
| RACK 4 | 20% | 8 KW |

RACK 1: 12 KW

| SERVER | MINIMUM GUARANTEED POWER RATIO | MINIMUM GUARANTEED POWER VALUE |
|---|---|---|
| SERVER 1 | 30% | 3.6 KW |
| SERVER 2 | 30% | 3.6 KW |
| SERVER 3 | 30% | 3.6 KW |
| SERVER 4 | 10% | 1.2 KW |

FIG.4

| USER CONTRACT TYPE | |
|---|---|
| CPU TYPE | XEON |
| OPERATION FREQUENCY | 3.0 GHz |
| MEMORY | 1 GByte |
| HD CAPACITY | 80 GByte |
| NW BAND | 1 Gbps |
| ID ADDRESS | xx. xx. xx. xx |
| ENABLE/DISABLE AUTO BACKUP | DISABLE |
| ⋮ | ⋮ |
| MINIMUM GUARANTEED POWER RATIO | 70% |
| ⋮ | ⋮ |

FIG.6

| SERVER | MINIMUM GUARANTEED POWER VALUE | MINIMUM GUARANTEED POWER RATIO | POWER CURTAILMENT THRESHOLD VALUE | POWER RESTORATION THRESHOLD VALUE |
|---|---|---|---|---|
| SERVER 1 | 3.6 KW | 70% | 11.5 KW | 10 KW |
| SERVER 2 | 3.6 KW | 80% | | |
| SERVER 3 | 3.6 KW | 50% | | |
| SERVER 4 | 1.2 KW | 100% | | |

SYSTEM AND METHOD FOR SAVING POWER CONSUMPTION BY INDIVIDUALLY REDUCING POWER USAGE OF EACH OF PLURALITY OF COMPUTERS TO A RESPECTIVE LOWER LIMIT WITHIN A SERVER SYSTEM

BACKGROUND OF THE INVENTION

1. Field of the Invention

The present invention relates to a technology for saving the power consumption of a server system.

2. Description of the Related Art

Recently, enhancement of server capacity is resulting in a significant rise in power consumption of servers. Especially, so called blade servers have higher central processing unit (CPU) density than the so called rack mount servers, so that the blade servers consume higher power. Therefore, in places such as the so called Internet Data Centers (IDC's), which includes many blade servers, a power layout is carried out to ensure that sufficient power is supplied.

However, recently, increasingly high performing CPU's are used in the servers and multiple such CPU's are mounted on a single server. Sometimes the required amount of power can exceed the estimated amount of power in the original power layout. To avoid this, it becomes necessary to restrict the number of servers mounted on a rack.

Further, as the temperature tends to build at some places depending on the placement of the servers or the air-conditioning, it is necessary to control power consumption by reducing the number of servers mounted on the rack taking into account the temperature.

Thus, when there is a restriction on the power that is supplied to the server system, generally solution is sought by reducing the number of servers or installing servers that consume less power. Unfortunately, these measures compromise the servers' processing capacity.

Japanese Patent Laid-Open Publication No. 2005-202506 discloses a method for controlling power consumption by each server blade by adding hardware called blade management controller (BMC) to a server blade in a blade server system.

However, the conventional tactics, such as reducing the number of servers or installing servers that consume less power, adversely affect the processing capacity of the server system. To counter the problem, the power design of the entire server system will need to be overhauled. However, this solution is not practical as overhauling the power design also affects parts that are not involved in higher power consumption.

The power consumption of the blade server system can be curtailed by managing the power consumption per server blade in the blade server system. However, the power consumption of the entire server system that includes rack-mounted servers cannot be controlled.

Thus, there is need of a technology that can reduce the power consumption of a server system without compromising the processing capacity of the server system.

SUMMARY OF THE INVENTION

It is an object of the present invention to at least solve the problems in the conventional technology.

According to an aspect of the present invention, a computer-readable recording medium that stores therein a computer program that causes a computer in a computer system to execute comparing actual power consumption of the computer system with a threshold value; and restricting power consumption of the computer based on a power-saving policy for the computer that represents a lower limit of power usable by the computer if a result of comparison at the comparing indicates that the actual power consumption is greater than or equal to the threshold value.

According to another aspect of the present invention, a server system comprises a control device and plurality of server devices. The control device includes a calculating unit that calculates an actual power consumption of the server system; and a notifying unit that notifies the actual power consumption to the server devices. Each server device includes a comparing unit that compares the actual power consumption with a threshold value; and a curtailing unit that restricts power consumption of the server device based on a power-saving policy for the server device that represents a lower limit of power usable by the server device if a result of comparison by the comparing unit indicates that the actual power consumption is greater than or equal to the threshold value.

According to still another aspect of the present invention, a power control method realized on a server system that includes a control device and plurality of server devices. The control device performs calculating an actual power consumption of the server system; and notifying the actual power consumption to the server devices. Each server device performs comparing the actual power consumption with a threshold value; and restricting power consumption of the server device based on a power-saving policy for the server device that represents a lower limit of power usable by the server device if a result of comparison at the unit indicates that the actual power consumption is greater than or equal to the threshold value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 depicts tables for explaining the contents of a database defined in a central control device shown in FIG. 2;

FIG. 4 depicts a table for explaining an example of a policy according to the embodiment;

FIG. 6 is an example of contents of a policy table according to the embodiment;

DETAILED DESCRIPTION OF THE PREFERRED EMBODIMENTS

Exemplary embodiments of the present invention are explained next with reference to the accompanying drawings. A large-scale server system of a data center such as an Internet Data Center (IDC) is presented as an example. However, the present invention can be applied to any system having a plurality of servers.

Figure 1:
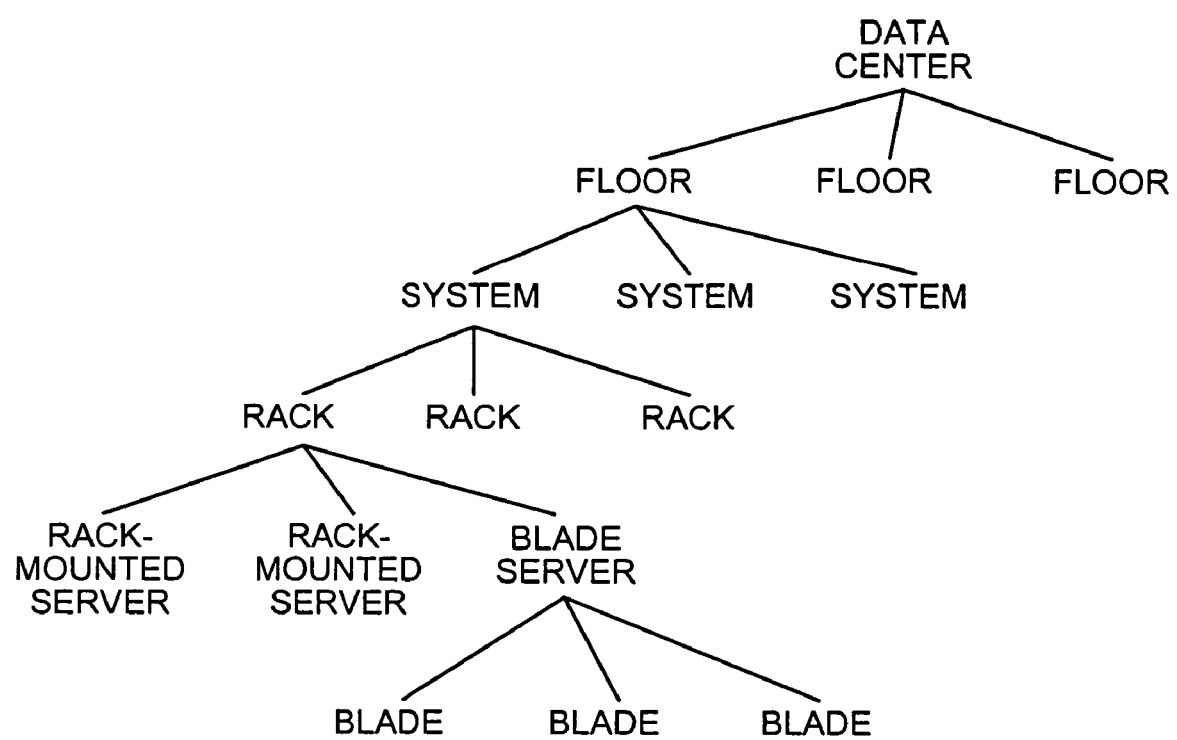
FIG. 1 is a schematic of a topology indicating a hierarchical structure of a data center.

FIG. 1 is a schematic of a topology indicating a hierarchical structure of a typical data center. The data center consists of more than one floor, each floor having more than one system. Further, each system has more than one rack. Mounted on each rack are one or more rack-mounted servers or blade servers. Each blade server generally includes more than one server blade.

In such a data center, a power line (not shown) connects a power supply unit (not shown) to each of the systems. The power supplied to the system is fixed, depending on the power capacity of the power supply unit. The upper limit of the power supplied to each rack in the system is dynamically set. The group of racks for which the upper limit of the power supplied is dynamically set is hereinafter referred to as "power group".

Figure 2:
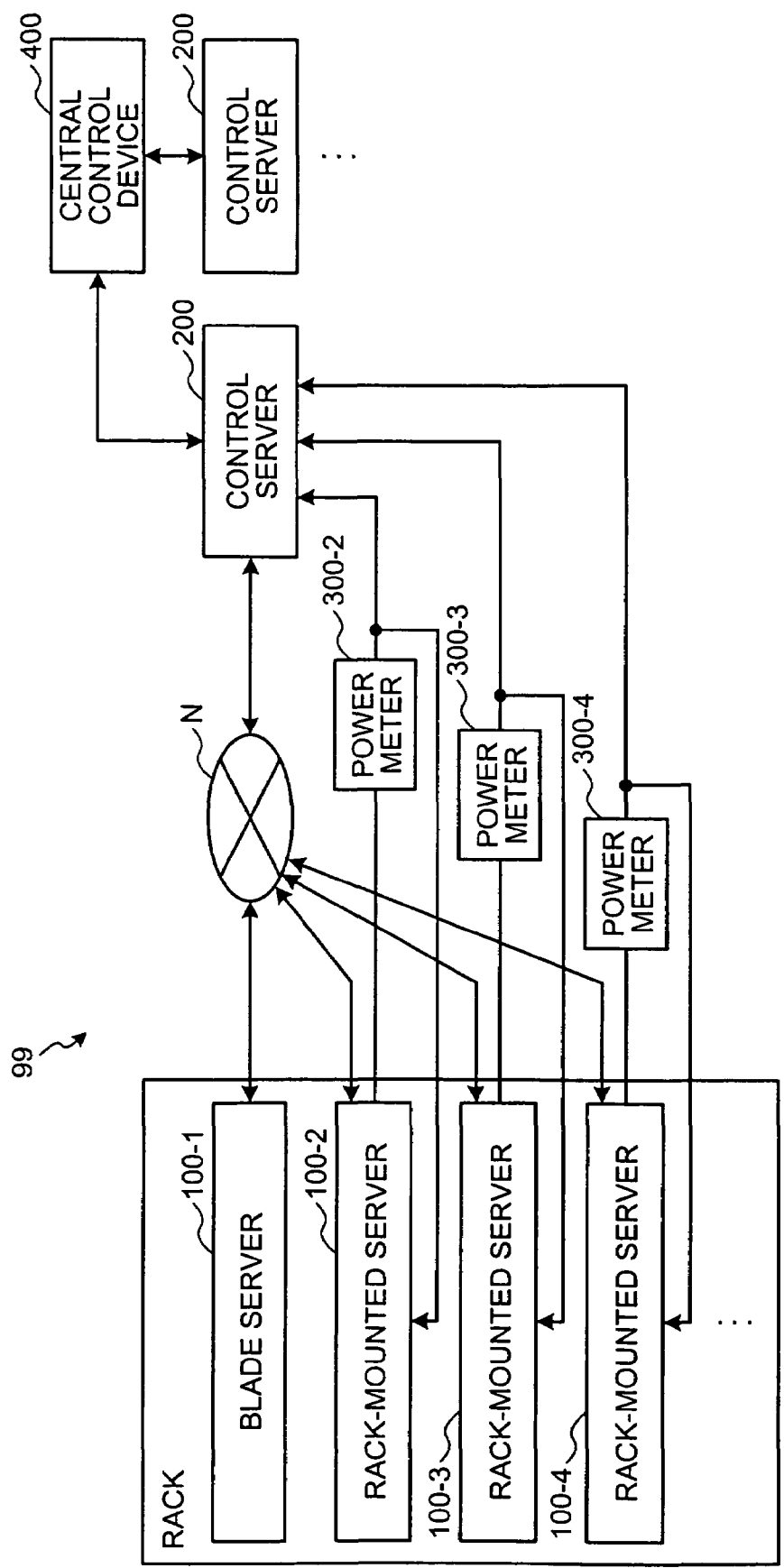
FIG. 2 is a block diagram of a data center according to an embodiment of the present invention.

FIG. 2 is a block diagram of a data center 99 according to an embodiment of the present invention. It is assumed that servers mounted on each rack form a power group. Also, it is assumed that each system includes only one rack. Thus, the upper value of the power fed to a blade server 100-1 and rack-mounted servers 100-2 to 100-4 is set based on the power supplied to the entire system. The data center 99 includes a rack on which are mounted the blade server 100-1 and the rack-mounted server 100-2 to 100-4, a control server 200, power meters 300-2 to 300-4, and a central control device 400.

The power consumption of each server blade of the blade server 100-1 is determinable, and the power consumption of the entire blade server 100-1 is reported to the control server 200 over a network N. The power meters 300-2 to 300-4 installed on the respective power lines of the rack-mounted servers 100-2 to 100-4 determine the power consumption of the respective rack-mounted servers 100-2 to 100-4, and report it to the control server 200.

One control server 200, provided per power group, notifies system power consumption to each server belonging to the power group via the network N. System power consumption refers to the power consumption of the entire system. If the system power consumption increases, the control server 200 notifies a power-saving policy, representing the power consumption of each server of the power group, via the network N. The central control device 400 that controls the entire data center 99 maintains the all the unit power policies of the data center 99, and conveys to the control server 200 the unit power policies pertaining to the power group assigned to the control server 200.

Specifically, a database such as the one shown in FIG. 3 is defined in the central control device 400. The database contains power distribution values, determined by the power fed, to the floors, systems, and racks. The power distribution values are fixed by the actual capacity of the physical cable or the power supply installation being used. As the power fed to the rack is dynamically distributed, the power distribution to the servers in the power group is set such that each server is fed a minimum guaranteed power value, representing the lower limit of the power usable by the server. In FIG. 3, the minimum guaranteed power value represents the power-saving policy.

In other words, as shown in FIG. 3, the power distribution value of Rack 1 is 12 KW. If under the circumstances, the power consumption of Server 3 and Server 4 is very low, power distribution to the servers can be adjusted so that Server 1 consumes 5 KW power and Server 2 consumes 4 KW power the power distribution value to Rack 1 is 12 KW.

However, if the total power consumption of Servers 1 to 4 approach 12 KW, the respective servers (in the example presented here, Server 1 and Server 2) restrict their power consumption to the minimum guaranteed power values. The central control device 400 extracts the power-saving policy of the each power group from the database and transmits it to the relevant control server 200.

The power-saving policy is formulated when a user enters a contract for using the server. FIG. 4 is drawing of an example of a policy formulated when the user enters a contract. The policy also states, as a ratio with respect to the maximum consumable power of the server, the minimum guaranteed power rate, which represents the power-saving policy. Contract rate, for example, may be set based on the minimum power policy value. If a user needs to meet the requirement for high CPU processing capacity at all times, the user may enter a contract for a large power-saving policy. However, if a user does not need high processing capacity all the time but only for short spans, the user may enter a contract for a small power-saving policy, thus reducing contract costs. Further, the operators of the data center 99 can restrict the system power consumption while at the same time extending the services.

Figure 5:
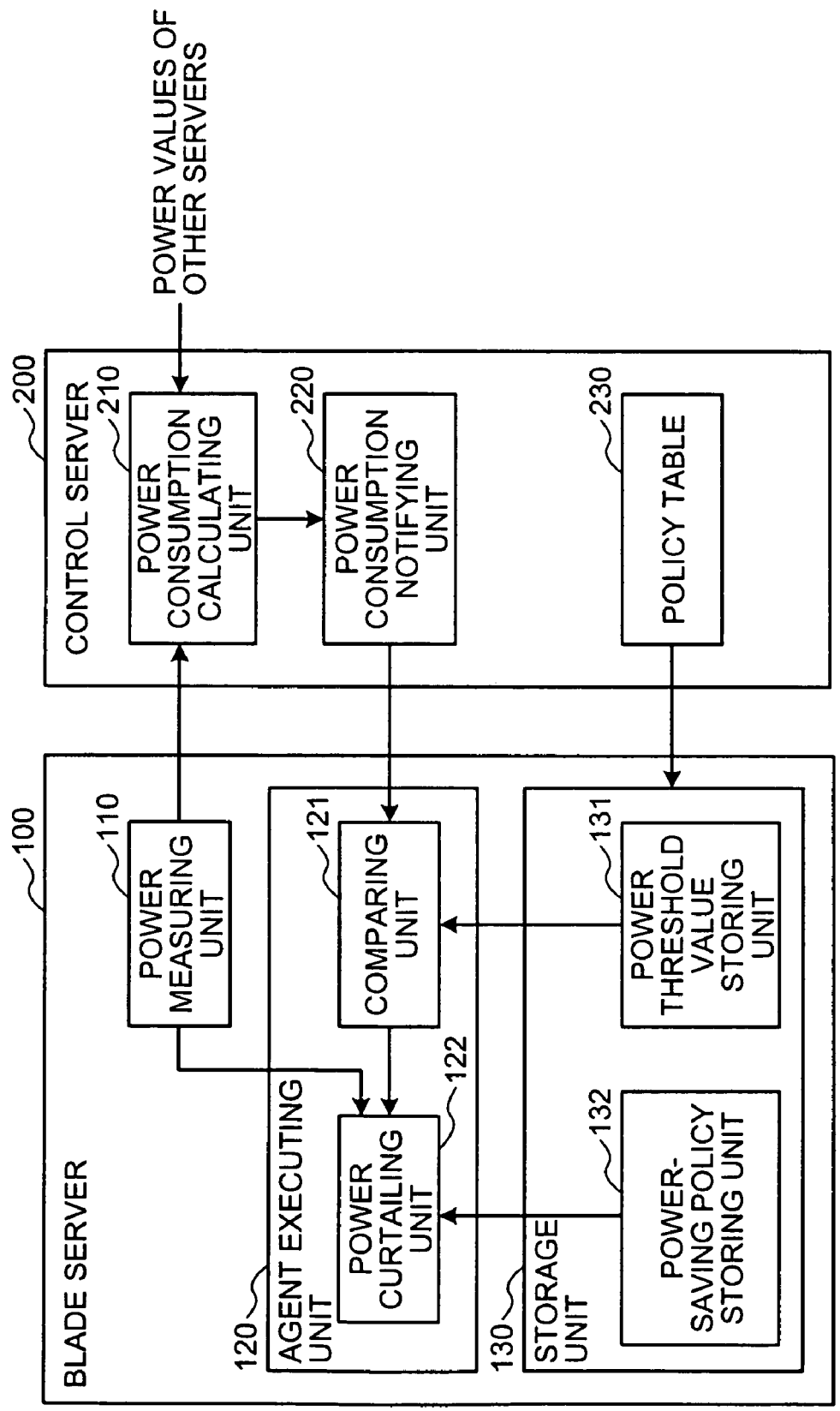
FIG. 5 is a block diagram of principal parts of a blade server and a control server shown in FIG. 2.

FIG. 5 is a block diagram of the principal parts of the blade server 100 and the control server 200 according to the present embodiment. The blade server 100 includes a power measuring unit 110, an agent executing unit 120, and a storage unit 130. The control server 200 includes a power consumption calculating unit 210, a power consumption notifying unit 220, and a policy table 230. The blade server 100 shown in FIG. 5 includes not shown plurality of server blades. The blade server 100 is presented as an example of a server in FIG. 5. However, the server can be a rack-mounted server, which does not include the power measuring unit 110. In the case of a rack-mounted server, power meter connected to the rack-mounted server reports the power consumption to the control server 200. FIG. 5 also does not show the network N shown in FIG. 2.

The power measuring unit 110 measures the power consumption of the not shown server blades of the blade server 100 and notifies the power consumption of each server blade to the agent executing unit 120. The power measuring unit 110 also reports the total power consumption of the blade server 100 by totaling up the power consumption of all the server blades to the control server 200.

The agent executing unit 120 executes an agent program from the time the server blades are started up, and when the system power consumption of the system to which the blade server belongs 100 reaches a designated threshold value, restricts the power consumption of the server blades. Specifically, the agent executing unit 120 includes a comparing unit 121 and a power curtailing unit 122.

The comparing unit 121 compares the system power consumption notified by the control server 200 and a designated power curtailment threshold value or a designated power restoration threshold value stored in the storage unit 130, and notifies the comparison result to the power curtailing unit 122.

If the comparison result from the comparing unit 121 indicates that the system power consumption is greater than or equal to the designated power curtailment threshold value, the power curtailing unit 122 restricts the power consumed by the server blades to the value stated in the power-saving policy. In other words, when the system power consumption becomes greater than or equal to the designated power curtailment threshold value, the power curtailing unit 122 restricts the power consumption by reducing the processing capacity of the server blades, for instance, by reducing the operation frequency of the CPU, limiting the communication bandwidth, cutting down the memory usage, etc. If the comparison result from the comparing unit 121 indicates that the system power consumption is under the designated power restoration threshold value, the power curtailing unit 122 lifts the power restriction to the server blades. The power curtailing unit 122 restricts the power or lifts power restriction, the power consumption of all the servers in the power group (including the server blades) changes at the same time. However, the power curtailing unit 122 does not allow the system power consumption to change suddenly as a result of the simultaneous change in the power consumption of the servers but brings about a gradual change in the power consumption from the current levels in accordance with the power-saving policy. The control the power curtailing unit 122 exerts to bring about the gradual change in the power consumption is explained later.

The storage unit 130 stores the system power consumption threshold values and the power-saving policy of each server blade. The system power consumption threshold values determine whether the power consumption of the server blades is to be restricted according to the power-saving policy. Specifically, the storage unit 130 includes a power threshold value storing unit 131 and a power-saving policy storing unit 132.

The power threshold value storing unit 131 stores the power curtailment threshold value and the power restoration threshold value notified by the control server 200. The power curtailment threshold value is the system power consumption when the power consumption of the server blades is restricted to the value stated in the power-saving policy. The power restoration threshold value is the system power consumption when the restriction on the power consumed by the server blades is lifted.

The power curtailment threshold value can be a total power of the unit power policies of all the servers belonging to a power group or a power distribution value assigned to the entire system. For the total power of the unit power policies of all the servers belonging to a power group to be considered the power curtailment threshold value, the power distribution value assigned to the system should be equal to greater than the sum of the unit power policies. However, it yields good unit power effect, enabling implementation of all the servers belonging to the power group, thus enhancing the performance efficiency of the system. If the power distribution value assigned to the entire system is considered the power curtailment threshold value, some servers have to be kept idle depending on the power curtailment threshold value (that is, power distribution value of the system) and unit power policies of the power group, to keep the sum of the unit power policies of the power group within the power curtailment threshold value. Consequently, the performance efficiency of the system comes down.

The power-saving policy storing unit 132 stores the unit power policies of the server blades notified by the control server 200. In other words, the power-saving policy storing unit 132 the lower limit of the power usable by each server blade when the system power consumption becomes greater than or equal to the power curtailment threshold value.

The power consumption calculating unit 210 totals up the power consumption of all the servers belonging to the power group of the blade server 100 and calculates the system power consumption. The power consumption notifying unit 220 notifies the system power consumption calculated by the power consumption calculating unit 210 to all the servers belonging to the power group of the blade server 100.

The policy table 230 is a table such as the one shown in FIG. 6 and contains the unit power policies of all the servers belonging to the power group assigned to the control server 200. In other words, the policy table 230 stores the minimum power guaranteed to each server belonging to the power group even when the system power consumption becomes greater than or equal to the power curtailment threshold value. In FIG. 6, the unit power policies are stored as the minimum guaranteed power ratio and a minimum guaranteed power ratio, which is the ratio of the minimum guaranteed power ratio to maximum power value, represented in percentage, for Server 1 to Server 4.

The policy table 230 stores power curtailment threshold value of the entire system that controls the system power consumption and the power restoration threshold value of the entire system that lifts the restriction on the system power consumption according to the power-saving policy of each server belonging to the power group. As shown in FIG. 6, both the power curtailment threshold value and the power restoration threshold value are less than or equal to the sum of the minimum guaranteed power values of all the servers belonging to the power group (12 KW in FIG. 6), and the power curtailment threshold value (11.5 KW in FIG. 6) is greater than the power restoration threshold value (10 KW in FIG. 6). Thus, by introducing a difference in the power curtailment threshold value and the power restoration threshold value, that is, by allowing a hysteresis between restriction and restoration of power, repeated switching between power restriction and restoration is prevented. The policy table 230 is transmitted from the central control device 400.

Figure 7:
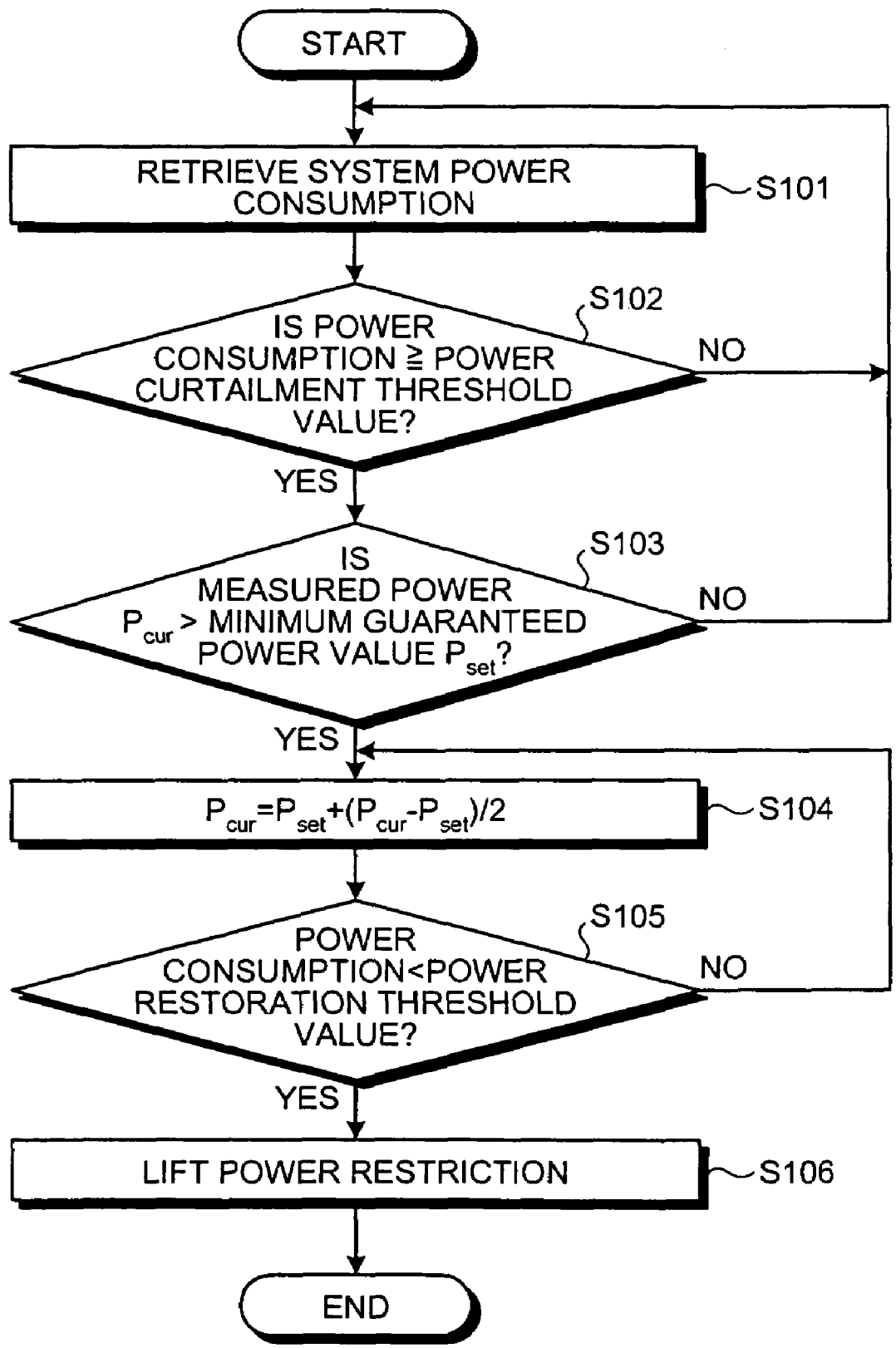
FIG. 7 is a flowchart of a process procedure for power restriction in the server blade.

FIG. 7 is a flow chart of the power restriction imposed by the agent program acting on the server blade according to the present embodiment. In the present embodiment, the agent executing unit 120 of each server blade executes the agent program, thereby independently restricting its own power consumption without requiring the intervention of the control server 200.

The control server 200 calculates the power consumption of the entire system that includes all the servers belonging to the power group and notifies the calculated value at regular intervals to the agent executing unit 120 of each server blade. The comparing unit 121 retrieves the calculated system power consumption (step S101) and determines whether the system power consumption is greater than or equal to the power curtailment threshold value stored in the power threshold value storing unit 131 (step S102). If the system power consumption is found to be under the power curtailment threshold value ("No" at step S102), the server blade does not require to restrict power consumption and awaits the next notification of the system power consumption from the control server 200.

If the power consumption of the entire system is found to be greater than or equal to the power curtailment threshold value ("Yes" at step S102), the comparing unit 121 notifies the determination result to the power curtailing unit 122. The power curtailing unit 122 compares the power consumption of the server blades measured by the power measuring unit 110 (hereinafter, "measured power $P_{cur}$" and a minimum guaranteed power value $P_{set}$ stored as the power-saving policy in the power-saving policy storing unit 132 (step S102). If the measured power $P_{cur}$ is found to be less than or equal to the minimum guaranteed power value $P_{set}$ ("No" at step S103), the server blade does not require to restrict power consumption and awaits the next notification of the system power consumption from the control server 200.

If the measured power $P_{cur}$ is found to be greater than or equal to the minimum guaranteed power value $P_{set}$ ("Yes" at step S103), the power curtailing unit 122 imposes power restriction in such a way that the measured power $P_{cur}$ measured by the power measuring unit 110 equals the value derived from the following equality (step S104).

$$P_{cur}=P_{set}+(P_{cur}-P_{set})/2 \quad (1)$$

That is, the power consumption of the server blades is restricted to a value which is half of the difference between the measured power $P_{cur}$ and the minimum guaranteed power value $P_{set}$ over the minimum guaranteed power value $P_{set}$. The power curtailing unit 122 restricts power consumption by reducing the operation frequency of the CPU, limiting the communication bandwidth, cutting down the memory usage, etc.

When the power curtailing unit 122 restricts the power consumption of the blade server, the control server 200 again notifies the system power consumption to the servers, and the comparing unit 121 again determines whether the system power consumption is under the power restoration threshold value stored in the power threshold value storing unit 131 (step S105). If it is found that the system power consumption is greater than or equal to the power restoration threshold value ("No" at step S105), the comparing unit 121 determines that the system power consumption is still large, prompting the power curtailing unit 122 to once again impose power restriction according the equality (1).

Thus, according to the present embodiment, the power consumption of the server blades is not at once reduced to the minimum guaranteed power value $P_{set}$, but is brought down step-by-step by repeatedly imposing power restriction according to the equality (1). If the power consumption of all the servers belonging to the power group (including the server blades) is reduced all at once to the minimum guaranteed power value, representing the power-saving policy, there will be a sudden fall in the power consumption, which will prompt a lifting of power restriction in response, resulting in a sudden increased power consumption. As a result, the system will oscillate repeatedly between fall in power consumption and increased power consumption In the equality (1), the power is repeatedly restricted to a power value that is midway between the measured power $P_{cur}$ and the minimum guaranteed power value $P_{set}$. However, the value added to the measured power $P_{cur}$ may be one-third or one-fourth of the difference between the measured power $P_{cur}$ and the minimum guaranteed power value $P_{set}$, thus shortening the time for the power consumption of the server blades to reach the minimum guaranteed power value $P_{set}$. On the other hand, if the change in the system power consumption is gradual, reducing the processing capacity of the server blades accompanying reduced power consumption can be prevented without having to at once reducing the measured power $P_{cur}$.

If it is found that the system power consumption is under the power restoration threshold value ("Yes" at step S105), the comparing unit 121 determines that the system power consumption is sufficiently low and lifts the power restriction imposed by the power curtailing unit 122 (step S106). Lifting of power restriction should also be preferably performed step-by-step like imposition of power restriction. As the power restoration threshold value is smaller than the power curtailment threshold value, the need for imposing power restriction immediately after lifting of power restriction seldom arises.

According to the embodiment, once the server blades retrieve the system power consumption from the control server 200, the agent program of the agent executing unit 120 performs power restriction and the lifting of power restriction of the server blades. Power restriction and lifting of power restriction are similarly performed on the servers belonging to a power group. Consequently, even if there is malfunctioning of the control server 200 or the network N, the system power consumption can be appropriately restricted, thereby improving the reliability of the system.

Figure 8:
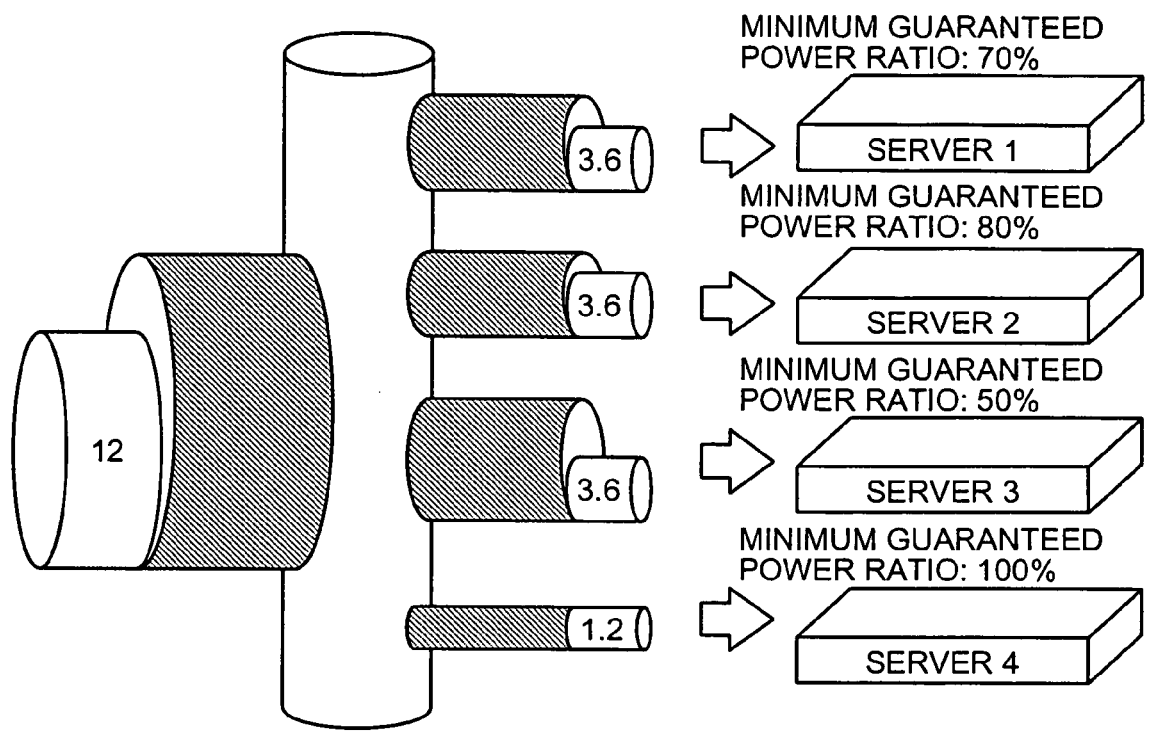
FIG. 8 is a schematic for explaining a power-saving policy in a system according to the embodiment.

The power-saving policy is explained next. As shown in FIG. 6, a power-saving policy, representing the minimum guaranteed power value and the minimum guaranteed power ratio, is stated for each of Servers 1 to 4 belonging to the power group. For example, a power-saving policy of 3.6 KW, which corresponds to 70% of the maximum power, is stated for Server 1. FIG. 8 is a schematic for explaining the power-saving policy of the system according to the present embodiment. In FIG. 8, the hatched cylinders corresponding to Servers 1 to 4 denote the maximum power of the corresponding server, and the cylinders extending from the hatched cylinders towards the right of the sheet surface denote the minimum guaranteed power value representing the power-saving policy of the respective servers. The cylinders denoting the power-saving policy have sections areas equivalent to the minimum guaranteed power ratio with respect to section areas of the cylinders denoting the maximum power.

FIG. 8 also shows a hatched cylinder extending to the left of the sheet surface, denoting the maximum power of the power group and another cylinder extending from the hatched cylinder denoting the power, 12 KW, fed to the power group. In the system according to the present embodiment, Servers 1 to 4 consume power as per the requirement until the system power consumption reaches the power curtailment threshold value of 11.5 KW. Once the system power consumption reaches the power curtailment threshold value of 11.5 KW, each server independently impose restriction on power consumption on itself. Under power restriction, Servers 1 to 3 cut down their consumption to 3.6 KW and Server 4 cuts down its consumption to 1.2 KW. Thus, the system power consumption is kept under 12 KW or less, the power fed to the power group providing for all the servers. Further, if the sum (12 KW in FIG. 8) of the minimum guaranteed power values, which represent the unit power policies, is made a target value for unit power, the system power consumption can be made always less than the power fed to the power group, thereby enhancing unit power efficiency.

Thus, according to one aspect of the present invention, power consumption of a system can be restricted to a designated value without having to reduce the number of servers or the processing capacity of the servers, thereby reducing the system power consumption without compromising the processing capacity of the system.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores therein a computer program that is executed by a computer in a computer system including a plurality of computers, the computer program causing the computer to execute:

comparing actual power consumption of the computer system with a first threshold value;

comparing, when the actual power consumption of the computer system is greater than or equal to the first threshold value, power consumption of each of the computers with a lower limit of power usable by each respective computer defined by a power-saving policy for each respective computer, the lower limit varying among different computers in the system; and restricting, when a power consumption of one or more of the computers is greater than the respective lower limit, the power consumption of each of the computers having a power consumption greater than the respective lower limit.

2. The computer-readable recording medium according to claim 1, wherein the restricting includes suppressing current power consumption of each of the computers having a power consumption greater than the respective lower limit to a power value that is greater than the lower limit by half of a difference between the current power and the lower limit.

3. The computer-readable recording medium according to claim 1, wherein the restricting includes repeatedly restricting the power consumption of each of the computers having a power consumption greater than the respective lower limit to a power value that is midway between a current power consumption of the computer and the lower limit.

4. The computer-readable recording medium according to claim 1, wherein the computer program further causes the computer to execute without performing the restricting if the actual power consumption is less than or equal to a second threshold value.

5. The computer-readable recording medium according to claim 4, wherein the computer program further causes the computer to execute increasing the power consumption of each of the computers from the power value stated in the power-saving policy step-by-step.

6. The computer-readable recording medium according to claim 4, wherein the second threshold value is less than the first threshold value.

7. The computer-readable recording medium according to claim 1, wherein the restricting includes restricting the power consumption of each of the computers having a power consumption greater than the respective lower limit by reducing an operation frequency of a central processing unit of each of the respective computers.

8. The computer-readable recording medium according to claim 1, wherein the restricting includes restricting the power consumption by limiting a communication bandwidth of each of the computers having a power consumption greater than the respective lower limit.

9. The computer-readable recording medium according to claim 1, wherein the restricting includes restricting the power consumption restricting usage of a memory of each of the computers having a power consumption greater than the respective lower limit.

10. The computer-readable recording medium according to claim 1, wherein the computer program further causes the computer to execute calculating the first threshold value based on power-saving policies of all computers in the computer system.

11. The computer-readable recording medium according to claim 1, wherein the computer program further causes the computer to execute calculating the first threshold value based on power distribution values assigned to the computer system.

12. A server system comprising a control device and a plurality of server devices, wherein
the control device includes
a calculating unit that calculates an actual power consumption of the server system; and
a notifying unit that notifies the actual power consumption to the server devices, and
each server device includes
a comparing unit that compares the actual power consumption with a threshold value; and
a curtailing unit that compares, when the actual power consumption is greater than or equal to the threshold value, power consumption of the server device with a lower limit of power usable by the server device defined by a power-saving policy for the server device, the lower limit varying among different server devices, and restrict, when the power consumption of the server device is greater than the lower limit corresponding to the server device, the power consumption of the server device.

13. A power control method realized on a server system that includes a control device and a plurality of server devices,
the control device performing
calculating an actual power consumption of the server system; and
notifying the actual power consumption to the server devices, and
each server device performing
comparing the actual power consumption with a threshold value;
comparing, when the actual power consumption is greater than or equal to the threshold value, power consumption of the server device with a lower limit of power usable by the server device with a lower limit of power useable by the server device defined by a power saving policy for the server device, the lower limit varying among different server devices; and
restricting, when the power consumption of the server device is greater than the lower limit corresponding to the server device, the power consumption of the server device.

* * * * *